United States Patent [19]
Wargotz

[11] Patent Number: 5,329,605
[45] Date of Patent: Jul. 12, 1994

[54] UNDERSEA ARMORED CABLE

[75] Inventor: W. Bernard Wargotz, Red Bank, N.J.

[73] Assignee: AT&T Bell Laboratories, Murray Hill, N.J.

[21] Appl. No.: 966,789

[22] Filed: Oct. 27, 1992

[51] Int. Cl.$^5$ .............................. G02B 6/44; H01B 7/14
[52] U.S. Cl. ........................................ 385/107; 156/51; 156/56; 174/102 R; 174/120 C; 174/121 R; 174/122 C
[58] Field of Search ............ 174/102 R, 102 C, 121 R, 174/120 C, 122 O; 385/102, 107; 156/51, 56

[56] References Cited

U.S. PATENT DOCUMENTS

| | | | |
|---|---|---|---|
| 2,003,991 | 6/1935 | Carlson | 174/121 R |
| 2,047,271 | 7/1936 | Kennedy | 174/121 R |
| 2,141,910 | 12/1938 | Hayman | 174/102 R |
| 2,164,904 | 7/1939 | Cook | 174/121 R |
| 2,442,307 | 5/1948 | McMahon | 174/107 |
| 4,974,926 | 12/1990 | Blee et al. | 385/107 |
| 5,101,467 | 3/1992 | Bernard | 385/112 |
| 5,125,061 | 6/1992 | Marlier et al. | 385/107 X |

FOREIGN PATENT DOCUMENTS 2732652  1/1978  Fed. Rep. of Germany .

Primary Examiner—Morris H. Nimmo
Attorney, Agent, or Firm—Oleg E. Alber

[57] ABSTRACT

A waterproofed, insulated conductor or cable and a method of fabricating the same using a new slushing compound is described. The waterproofed insulated conductor or cable includes a core with at least one conductor element, a polymeric insulation jacket, at least one textile covering over the polymeric jacket, and at least one waterproof coating on top of said at least one textile covering, the waterproof coating comprising a blend of from 15 to 40, preferably 20, weight percent of pine tar oil, the remainder being essentially natural (Trinidad) asphalt. The invention is especially suitable for fabricating armored cables in which armor wires, deposited on a textile yarn bedding, are embedded in a coating of the blend and further are covered by at least one textile yarn roving and a waterproof coating on top of each of said at least one waterproof coating. Pine tar oil-based blends demonstrate mechanical, physical and handling characteristics comparable to cables waterproofed with prior-art coal tar oil-based blends. Furthermore, the new blends use lesser quantities of pine tar oil than the quantity of coal tar oil in the prior-art blends, leading to lower losses of oil prior to and during the application of hot blends.

22 Claims, 1 Drawing Sheet

UNDERSEA ARMORED CABLE

TECHNICAL FIELD

This invention pertains to insulated conductors or cables having moisture or water-resistant barriers, such as an undersea armored cable.

BACKGROUND OF THE INVENTION

Insulated conductors or cables which typically include a core with at least one conductor and a polymeric jacket about the core, have been used in varied environments including passage through terrains which include moisture-laden areas, for example, swamps, rivers, lakes and the deep sea. Often, the material of the polymeric jacket permits penetration of the moisture to the core and, eventually, to the conductor which in turn results in deleterious interaction with the conductor. To avoid such deleterious interactions, the polymeric jacket is required to be moisture proofed by means which will remain protective even after the handling of the cable, e.g., after a coiling or uncoiling operation in the loading and unloading of the cable into and from holding barrels or holds in the ship.

Prior art undersea armored cable used by AT&T, which includes a basic deep water cable with a central core and a polymeric insulation jacket, is an example of such a cable. The basic deep water cable is including at least one serving of textile yarn bedding on the jacket, a plurality of coal tar oil-coal tar pitch blend coated galvanized steel armor cables on the textile yarn bedding, a coating of coal tar oil-natural asphalt blend over the armor wires, and at least two servings of textile yarn roving over the coated wires, each roving coated with coal tar oil-natural asphalt blend coating. The "natural asphalt" is an asphalt naturally occurring in asphalt pits in Trinidad. Hereinafter, reference to "natural asphalt" means such a naturally occurring Trinidad asphalt.

In the process of preparing the armored cable, the jacket of the basic deep water cable was covered with at least one serving of the textile yarn bedding. Thereafter a plurality of galvanized steel armor wires were helically wound about the textile yarn bedding on the jacket. Each of the wires was pre-coated with a wire coating "enamel". The enamel coating is a blend of 70-80 weight percent of coal tar oil and 20-30 weight percent of coal tar pitch. The enamel coating was applied to galvanized wires by passing the wire through a vented vat of molten compound. The helically wound precoated (enameled) wires were then coated with molten cable slushing compound. The cable slushing compound specified for AT&T undersea communication cables comprises 35-50, preferably 40, weight percent coal tar oil, the remainder being essentially the natural asphalt. The coated wires were then covered by one serving of textile yarn roving, flooded with the slushing compound, covered with another serving of textile yarn roving and again flooded with the slushing compound. An excess of the slushing compound on the textile rovings was wiped off to reduce the possibility of any sticking (blocking) of coils of the cable each to another.

Cable slushing compound is employed for undersea armored cable systems to provide corrosion protection to the bedded galvanized steel armored wires and provide a moisture-impervious coating on the cable. The slushing compounds have been employed universally for decades in underwater power and communication cables, including the optical fiber communication cables.

Prolonged exposure of operating personnel to coal tar oil-coal tar pitch blend and to coal tar oil-natural asphalt blend without prudent and protective equipment, especially during application of the blends in the molten state, may lead to mild adverse health effects, such as dermatitis and photosensitivity. To reduce the risk possibly afforded by such blends, it is desirable to reduce or eliminate the use of coal tar oil and coal tar pitch in the undersea cable fabrication, while continuing to provide protection to the vital components of the cable against undersea exposure.

SUMMARY OF THE INVENTION

This invention embodies a waterproofed, insulated conductor or cable and a method of fabricating the same. The waterproofed insulated conductor or cable includes a core with at least one conductor element, a polymeric insulation jacket, at least one textile covering over the polymeric jacket, and at least one waterproof coating on top of said at least one textile covering, the waterproof coating comprising a blend of from 15 to 40, preferably 20, weight percent of pine tar oil, the remainder being essentially natural (Trinidad) asphalt. The invention is especially suitable for fabricating armored cables in which armor wires, deposited on a textile yarn bedding, are embedded in a coating of the blend and further are covered by at least one textile yarn roving and a waterproof coating on top of each of said at least one waterproof coating. Pine tar oil-based blends demonstrate mechanical, physical and handling characteristics comparable to cables waterproofed with prior-art coal tar oil-based blends. Furthermore, the new blends use lesser quantities of pine tar oil than the quantity of coal tar oil in the prior-art blends, leading to lower losses of oil prior to and during the application of hot blends.

DETAILED DESCRIPTION

Figure 1:
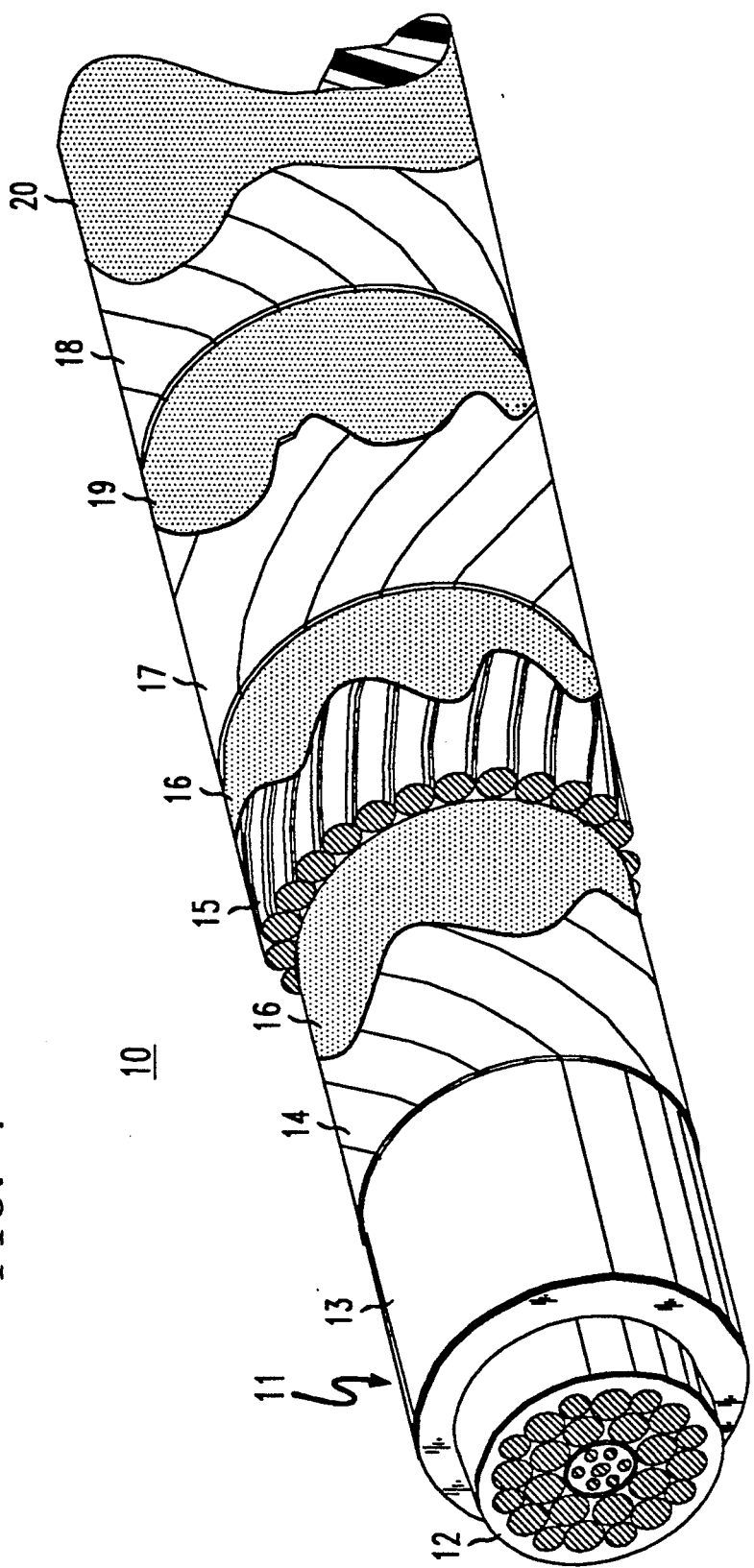
FIG. 1 is a schematic representation in perspective of an armored optical fiber communication cable.

The present invention is being described with reference to an undersea armored cable having a basic deep water cable. However, the invention is applicable to moisture-proofing any other cable or conductor comprising a central core having one or more conductor elements and a polymeric insulation jacket. The central core may have various arrangements of the conductor elements and reinforcing metallic members, if present. At least one of the reinforcing members may be arranged centrally, and some others may be arranged peripherally of the core. Such arrangements are well known in the art and need not be described here in detail.

An exemplary undersea armored cable, such as a lightguide communication cable, 10, shown schematically in FIG. 1 of the drawing, includes a basic deep water cable, 11, with a central core, 12, comprising one or more optical fibers, and a polymeric insulation jacket 13. Cable 10 further includes textile yarn bedding, 14, over jacket 13, galvanized steel armor wires, 15, a coating of pine tar oil-natural asphalt blend, 16, over the textile yarn bedding and over the armor wires, and at least two servings of textile yarn roving 17 and 18, on top of the wires, each roving being coated with a pine tar oil-natural asphalt blend coating, 19 and 20, respectively. The term "textile yarn" includes materials being used in conductor and cable industry in providing, in combination with waterproofing compounds, water-impermeable barriers. Such textile yarns may include fibers or tapes of jute, hessian and cotton tapes, fibers and tapes of such synthetic materials as polypropylene, nylon, polyesters, polyimides and others.

Cable 10 differs from the prior-art cables primarily in the novel coating compound which is being used for coating the armor wires, the textile yarn bedding, and textile yarn rovings. The invention also differs in the method of coating the cable with the novel coating compound.

In accordance with this invention, both the "enamel" composition and the slushing compound composition are replaced by a single slushing compound composition containing pine tar oil instead of the coal tar oil. This permits replacement of the prior art procedure, which includes first coating the wires with an "enameling" composition and then coating the wires with the slushing compound at separate operating stations, with an application of a single slushing compound about the core and the armor wires. Here, after textile yarn bedding 14 is applied over polymeric jacket 13 of basic deep water cable 11, bare wires 15 are wound on top of textile yarn bedding 14 in a helically wound fashion, and the slushing compound is applied as the wires are being wound. In this fashion, the textile yarn bedding is coated with the slushing compound, and the wires become embedded in the slushing compound on the textile yarn bedding and are also coated with the compound. The thickness of the compound coating is such that the wires are completely coated with the slushing compound. Thereafter, as successive servings of textile yarn rovings 17 and 18 are applied on top of the slushing compound coated wires, these servings are flooded in succession with the same slushing compound. An excess of the slushing compound on the respective surfaces being coated is wiped off after each application, leaving a thin, continuous layer of the slushing compound over the coated surface. This is of special importance for the outer coating, so as to reduce the possibility of outer coatings sticking each to another in storage where the cable may be stored in coils in storing vats or in the holds of a ship.

The novel undersea armored cable slushing compound is a blend of a pine tar oil with essentially natural asphalt. Pine tar oil is derived from the destructive distillation of pine tree stumps and bark, has a density of approximately 0.975, and comprises from 0 to 25, preferably 12±10, weight percent of rosin acid, 0 to 25, preferably 14±10, weight percent of fatty acids, and from 40 to 85, preferably 74±10, weight percent of oligomers. Bacterial assay testing suggested that pine tar oil is more benign environmentally than the coal tar oil. Also, pine tar oil is less occupationally sensitive than coal tar oil in natural asphalt formulation. The slushing compound according to the invention comprises 15–40, preferably 20, weight percent pine tar oil, the remainder being essentially natural asphalt. This slushing compound is applied in a molten state at temperatures of 230°±10° F. Both the coal tar oil and the pine tar oil act in a way of a "plasticizer" in the natural asphalt. Since in the preferred use, the slushing compound contains about one-half as much pine tar oil as the prior-art coal tar oil-based compound, the weight loss on heating the pine tar oil-based slushing compound in the process of applying the slushing compound to the cable is reduced. However, this does not significantly change the softening point or penetration of the cable slushing compound compared to the prior art coal tar oil-based compositions.

Comparative physical and chemical properties of 20 weight percent pine tar oil blend and a 40 weight percent coal tar oil blend with the natural asphalt are shown in Table I of the Appendix. The data presented in Table I suggests that pine tar oil-natural asphalt blend results in lesser weight loss on heating and no significant change in the softening point or penetration of hardened cable slushing compound compared to the coal tar oil-based blend. Comparable heat stability data on softening point and penetration suggests that the pine tar oil-based blend would store well during storage, shutdown and extended cable armoring production. Heat stability testing was conducted by first heating the slushing compound to 325° F. and then cooling the slushing compound to room temperature. Softening point was determined by heating the cooled, solidified compound, and the penetration test was conducted on the solidified compound.

Cable qualification testing on cables produced with pine tar oil-based slushing compound demonstrated mechanical, physical and handling characteristics comparable to those of the prior art cables. The low-temperature performance of the pine tar oil-natural asphalt blend presents an improvement over present coal tar oil-based cable slushing material. Cable qualification results are comparable to those exhibited by coal tar oil-natural asphalt applied to armored cable in a similar process. Shipboard handling of pine tar oil-natural asphalt externally coated armored cables is comparable to coal tar oil-natural asphalt coated armored cables.

The testing included the following:
Slushing Coverage:
Inspection for coverage on textile yarn covering, on wires and on textile yarn bedding, and sorption by polyethylene insulation (determined by extraction).
Cable Damage:
Inspection for contamination of insulation by adherent slushing compound after storage. Compliance with molding requirements. Examine for heat/pressure effects.
Mechanical:
Testing of pine tar oil-natural asphalt coated cable and control coal tar oil-natural asphalt coated cable for Tension-Rotation-Elongation, and Temperature/Flexure (5° C.) followed by dissection and examination.
Handling:
Cable storage tank removal unloading and shipboard loading.

For the purposes of cable qualification testing, a 10 kilometer length of undersea armored cable was prepared with pine tar oil-natural asphalt blend as cable slushing containing 20 weight percent pine tar oil, remainder being essentially the natural asphalt. The coal tar oil-natural asphalt blend used for preparing the prior art cable contained 40 weight percent of coal tar oil. Lower amounts of pine tar oil and correspondingly higher amounts of natural asphalt in this slushing compound, relative to the coal tar oil-natural asphalt blend, resulted in an increased melt viscosity of the blend. To counteract this, adjustments in melt viscosity were made by slightly raising the temperature of application toward the higher end of the temperature range indicated before (230°±10° F.) for use with the pine tar based blends.

Table II of the Appendix is a summary of the visual observations on slushing compound coverage on the structural components of a dissected cable prepared with pine tar oil blend compared to a cable prepared with coal tar oil blend. The subjective observation method revealed little difference in coverage exhibited by either cable employing the same method of application.

Some presence of pine tar oil-based slushing compound was discovered on the polymeric (polyethylene) jacket 13 of the trial basic deep water cable. This presence arose from an easily correctable accidental random separation of the textile yarn bedding, which permitted penetration of the cable slushing to and slight discoloration of the polymeric jacket. However, except for this discoloration, there was no significant difference between the surface of a polymeric jacket from the trial cable and from an armored cable which did not have surface discoloration. This suggests that surface discoloration occurred without any sorption into the polymeric jacket.

Furthermore, it was determined that the pine tar oil or pine tar oil-natural asphalt blend was not an environmental stress cracking reagent to polymeric jacketing material such as polyethylene. In addition, it was observed in immersion testing of polymeric jacketing material in hot (125° F.) pine tar oil, that pine tar oil has a lower affinity for polyethylene than coal tar oil.

An aging study was conducted by keeping the cable at 50° C. for 100 hours and then subjecting the cable to thermal cycling between 3° C. and 50° C. at 100 hour intervals. The aged cable samples were then dissected and the basic deep water cable was separated from the cable. It was observed that the outer layers of the textile yarn roving were more difficult to remove from the aged cable than from the unaged cable. The pine tar oil blend was flexible after aging and did not embrittle. In contrast, the coal tar oil blend tended to become brittle after aging.

Sections of polyethylene insulated basic deep water cables were joined by splicing in cable splice boxes and were subjected to testing. The tests included: an x-ray analysis for inclusions; microtome samples prepared encompassing the over-molding interfacial area and the recovered specimens tensile tested; and heat shrink testing. All tests were satisfactory and met requirements.

The armored cable was subjected to low-temperature flexing. The purpose of this test was to ascertain any differences in the low-temperature performance of the pine tar oil-natural asphalt and coal tar oil-natural asphalt blends adhering to the textile bedding and armored wires. After conditioning cable samples for 24 hours at 40° F.±8° F., the pine tar oil-natural asphalt and coal tar oil-natural asphalt coated cables were each flexed 50 cycles on a 36 inch radius. Each flexing cycle included movement of one end of a four foot long cable portion, while the other end of this portion remained fixed. The flexing began with movement of the free end of the cable through a 90° arc from a low starting position to a 90°-removed position, return to the starting position, movement of the cable in an opposite direction to another 90°-removed position and return to the starting position. After flex testing, the samples were dissected and the following subjective observations were noted. (A) The pine tar oil-natural asphalt cable slushing adhered to the textile yarn bedding, was not brittle and pulled away from the armor wires leaving the wires bare. In separating the armor wires, cohesive failure of the adherent coating occurred between interstices of the galvanized steel armor wires. (B) The coal tar oil-natural asphalt cable slushing on the armor wire textile yarn rovings was brittle; upon pulling the textile yarn off the armored wires, the coal tar-natural asphalt coating failed adhesively, exposing bare armor wires with the cable slushing adhering to the textile yarn and the armored wires could be readily separated from the brittle cable slushing between the interstices of the armor strands. The results of the low-temperature flex testing suggest that the pine tar oil blend is a better low-temperature performance coating than the coal tar oil blend and would retain its flexibility as a coating at low temperature and be less prone to embrittlement. This could be important if the armored cable is torqued during deployment or on the ocean bottom.

Sample lengths of both the pine tar oil-natural asphalt and coal tar oil-natural asphalt slushed armored cables were submitted to Tensile-Rotation-Elongation testing. The purpose for performing these tests was to determine if the change in material employed as cable slushing and the method of application of cable slushing compound at a single operating station affected the cable rotation (torque) during shipboard deployment. The test was performed by applying torque to one end of a length of a cable while maintaining the other end fixed. This resulted in twisting and elongation tensioning of the cable. The torque was conducted by applying torquing power ranging from 400 to 50,000 pounds force. The elongation was measured on a certain length of the cable centrally of the total length of the sample. The test results are presented in Table III. The data reveal no significant difference among the specimens.

After three-month storage (coiled in holding tanks), the 10 km length of cable was shipboard loaded. The shipboard loading was event-free (no "blocking") and little, if any, smearing observed during cable shipboard loading. These observations suggest that the approximately three months' long ambient storage does not result in creep and "blocking" between coils of stacked cable externally coated with pine tar oil-natural asphalt. The term "blocking" means sticking together of two or more coils of the cable after being stacked in successive coiled layers in holding tanks or in the ship's holds.

Samples of pine tar oil-natural asphalt blend slushing compound were withdrawn during the application of the slushing compound in processing the 10 km armored cable. These samples were tested to ascertain the processing stability. The results (Table IV of the Appendix) indicated that with time the pine tar oil-natural asphalt blend tends to increase in stiffness and viscosity. These effects do not appear to compromise the ability to process the coating during the fabrication of the armored cable.

This invention has been described with reference to an undersea armored lightguide cable. However, this invention is applicable to any other cable or conductor having a core with at least one conductor surrounded by a polymeric jacket which, in adverse moisture or wetness conditions, could be moisture-penetratable, adversely affecting operating characteristics of the conductor. The waterproofing composition in combination with textile yarns may also be used for waterproofing aluminum or other metallic sheets on the cable.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

TABLE I

APPENDIX
COMPARATIVE PHYSICAL PROPERTY DATA
PINE TAR OIL-NATURAL ASPHALT AND
COAL TAR OIL
NATURAL ASPHALT CABLE SLUSHING COMPOUND

| | | RESULT WITH | |
|---|---|---|---|
| Property | Test | Pine Tar Oil | Coal Tar Oil |
| Viscosity | 375° F. | 188 | 125 |
| Thermosel, cps | 302° F. | 438 | 250 |
| Heat Stability of 325° F. | Original | 122 | 115 |
| Softening Pt. | 4 hrs. | 120 | 117 |
| | 24 hrs. | 130 | 132 |
| Penetration (0.1 mm) | Original | 86 | 90 |
| | 4 hrs. | 75 | 76 |
| | 24 hrs. | 27-68 | 40 |
| Weight loss on Heating, percent | 5 hrs. at 325° F. | 0.7 | 1.4 |
| Corrosion of Copper | Copper Wire | NCT* | NCT* |

*NCT = No apparent Corrosion or Tarnishing

TABLE II

APPENDIX
CABLE SLUSHING COMPOUND COVERAGE

| | Natural Asphalt Blend With | |
|---|---|---|
| | Pine Tar Oil | Coal Tar Oil |
| 2nd Textile Yarn Roving (outside) | B | B |
| 1st Textile Yarn Roving | A | B |
| Armor Wire, Inner Surface | B | B |
| Armor Wire, Outer Surface | A | B |
| Textile Yarn, Bedding Outer Surface | A | A |

A - Heavy Tar
B - Medium Tar
C - Light Tar
D - No Tar

TABLE III

APPENDIX
SUMMARY OF TEST RESULTS

| | | Cable Rotation Degrees Per Foot | |
|---|---|---|---|
| Load Cycle | Tension Pounds | Pine Tar Oil-Natural Asphalt | Coal Tar Oil-Natural Asphalt |
| 1 | 32,000 | 29.3 | 28.8 |
| | 400 | 4.1 | 3.6 |
| 10 | 32,000 | 30.8 | 29.7 |
| | 400 | 5.1 | 4.3 |
| 11 | 50,000 | 63.0 | 59.8 |
| | 400 | 19.1 | 15.6 |
| 20 | 50,000 | 72.4 | 64.4 |
| | 400 | 30.4 | 20.4 |

TABLE IV

APPENDIX
PROCESS STABILITY PINE TAR OIL-ASPHALT BLEND

| Hours Exposed | Original | 24 | 48 | 120 | 150 | 175 |
|---|---|---|---|---|---|---|
| Softening Point °F. | 122 | 132 | 133 | 130 | 134 | 135 |
| Penetration | 80 | 47 | 42 | 44 | 39 | 38 |

TABLE IV-continued

APPENDIX
PROCESS STABILITY PINE TAR OIL-ASPHALT BLEND

| Hours Exposed | Original | 24 | 48 | 120 | 150 | 175 |
|---|---|---|---|---|---|---|
| (0.1 mm) Weight Loss percent after 5 hrs. at 325° F. | 0.7 | .671 | .443 | .341 | .370 | .449 |

I claim:

1. A waterproofed insulated conductor which comprises a core with at least one conductor element, a polymeric jacket about the core, at least one textile covering over the polymeric jacket and at least one waterproof coating on top of said at least one textile covering, wherein said at least one waterproofing coating comprises a blend of from 15 to 40 weight percent of pine tar oil, the remainder being essentially natural (Trinidad) asphalt.

2. The insulated conductor of claim 1, in which said blend comprises 20 weight percent of pine tar oil.

3. The insulated conductor of claim 1, in which said at least one textile covering comprises in succession from the polymeric jacket a textile yarn bedding and at least one textile yarn roving, said at least one waterproofing coating being on top of each successive covering.

4. The insulated conductor of claim 3, in which a row of helically wound armor wires is on top of said textile yarn bedding, the wires are imbedded in and coated with said waterproofing coating, and said at least one textile yarn roving is on top of the coated wires.

5. The insulated conductor of claim 1, in which said at least one conductor element is an optical fiber.

6. A deep sea armored cable which comprises a basic deep sea cable, comprising a core with at least one conductor, a polymeric insulation jacket about the core, a textile yarn bedding over the jacket, a plurality of helically wound armor wires upon the textile yarn bedding, a waterproofing coating on top of the textile yarn bedding and embedding the wires in the coating, at least one textile yarn roving on top of the coated wires, and at least one waterproofing coating on top of each of said of least one textile yarn roving, wherein said at least one waterproofing coating comprises a blend of from 15 to 40 weight percent of pine tar oil, the remainder being essentially natural (Trinidad) asphalt.

7. The deep sea armored cable of claim 6, in which said blend comprises 20 weight percent of pine tar oil.

8. The deep sea armored cable of claim 6, in which said at least one conductor is an optical fiber.

9. A method of fabricating a waterproofed insulated conductor comprising a core with at least one conductor element, and a polymeric jacket about the core, which method comprises applying at least one textile yarn covering on the polymeric jacket and applying at least one waterproofing coating on top of said at least one textile yarn covering, wherein said at least one waterproofing coating comprises a blend of from 15 to 40 weight percent pine tar oil, the remainder being essentially natural (Trinidad) asphalt.

10. The method of claim 9, in which said waterproofing coating comprises 20 weight percent of pine tar oil.

11. The method of claim 9, in which said waterproofing coating prior to the application is maintained at a temperature of 230°±10° F.

12. The method of claim 9, in which said at least one textile yarn covering comprises in succession from the polymeric jacket a textile yarn bedding and at least one textile yarn roving, said at least one waterproofing coating being on top of each successive covering.

13. The method of claim 12, in which a row of helically wound armor wires is on top of said textile yarn bedding, the wires are imbedded in and coated with said waterproofing coating, and said at least one textile yarn roving is on top of the coated wires.

14. The method of claim 9, in which said at least one conductor element is an optical fiber.

15. The method of fabricating a deep sea armored cable comprising a basic deep sea cable and a row of armor wires on the basic cable, which method comprises:
   applying a textile yarn bedding on the basic cable,
   helically winding a row of armor wires upon the textile yarn bedding,
   applying hot slushing compound comprising natural (Trinidad) asphalt to the textile yarn bedding and to the wires so as to coat the wires with a slushing compound,
   applying at least one textile yarn roving over the coated armor wires, and
   coating each of said at least one textile yarn rovings with said slushing compound, wherein said slushing compound comprises 15–40 weight percent of pine tar oil, the remainder being essentially said natural asphalt.

16. The method of claim 15, in which said slushing compound comprises 20 weight percent of pine tar oil.

17. The method of claim 15, in which said slushing compound prior to the application is maintained at a temperature of 230°±10° F.

18. The method of claim 15, in which said application of said slushing compound and winding of said armor wires is such that said slushing compound covers the surface of the textile yarn bedding, the wires are wound in contact with the slushing compound on the bedding, and the slushing compound coats the armor wires.

19. The method of claim 18, wherein one of said at least one textile yarn rovings is applied over said slushing compound-coated armor wires, and is coated with said slushing compound prior to the application of a subsequent textile yarn roving.

20. The method of claim 15, wherein the slushing compound is wiped-off, after each application in succession, of the armor wires and of said textile yarn rovings leaving a thickness of the slushing compound sufficient to effectively waterproof the cable.

21. The method of claim 15, in which said basic deep sea cable comprises a core with at least one conductor element and a polymeric jacket about said core.

22. The method of claim 21, in which said at least one conductor element is an optical fiber.

* * * * *